INVENTOR.
ALBIN E. WITTMANN
BY
W. E. Thibodeau, A. W. Dew
and R. F. Pippin, Jr.  ATTORNEYS

INVENTOR.
ALBIN E. WITTMANN

April 8, 1958     A. E. WITTMANN     2,830,264
AUTOMATIC CABLE TESTER

Filed April 29, 1955     3 Sheets-Sheet 3

INVENTOR.
ALBIN E. WITTMANN
BY W. E. Thibodeau, A. W. Dew
and R. F. Pippin Jr. ATTORNEYS United States Patent Office 2,830,264
Patented Apr. 8, 1958

2,830,264

AUTOMATIC CABLE TESTER

Albin Egon Wittmann, Huntsville, Ala., assignor to the United States of America as represented by the Secretary of the Army Application April 29, 1955, Serial No. 505,069

6 Claims. (Cl. 324—51)

(Granted under Title 35, U. S. Code (1952), sec. 266)

This invention may be manufactured and used by or for the U. S. Government without the payment to me of any royalties thereon.

This invention relates to an electrical testing apparatus, and more specifically to an apparatus for testing or analyzing a multiconductor cable.

In many types of modern equipment, various types of electrical or other equipment are employed in which the wiring requires the use of large numbers of cables, each having a substantial number of wires or conductors. In order to assure the proper operation of equipment and to assure against faults or defects in the cable which would render the equipment ineffective or inoperative, it is essential that the individual wires or conductors in each cable be tested for faults. Manual individual testing of each wire with appropriate instruments is a long, tedious, and time-consuming process, and further in testing in this manner, there is the risk of overlooking or missing individual wires or conductors in the cable. Obviously, neither the time consumed, nor the possibility of error in such an operation can be tolerated in many applications of multiconductor cables.

It is accordingly an object of this invention to provide a testing apparatus for the individual conductors of multiconductor cables which is fully automatic and which positively checks each of the conductors in the cable.

A further object of this invention is to provide a multiconductor testing apparatus which tests each wire or conductor in the cable simultaneously for shorts, low insulation resistance and continuity.

Another object is to provide a multiconductor test apparatus which sequentially tests each individual conductor in a multiconductor cable and which automatically stops and indicates the particular fault and particular cable when a fault is located.

Still a further object is to provide a testing apparatus for multiconductor cables wherein the testing of any particular cable is performed simultaneously for a plurality of possible faults without the necessity of timing apparatus for sequentially performing each individual test on the individual conductor.

Still further objects and many attendant advantages will become apparent upon reading the following detailed description taken in conjunction with the accompanying drawings of one embodiment of the invention, wherein.

Figure 1:
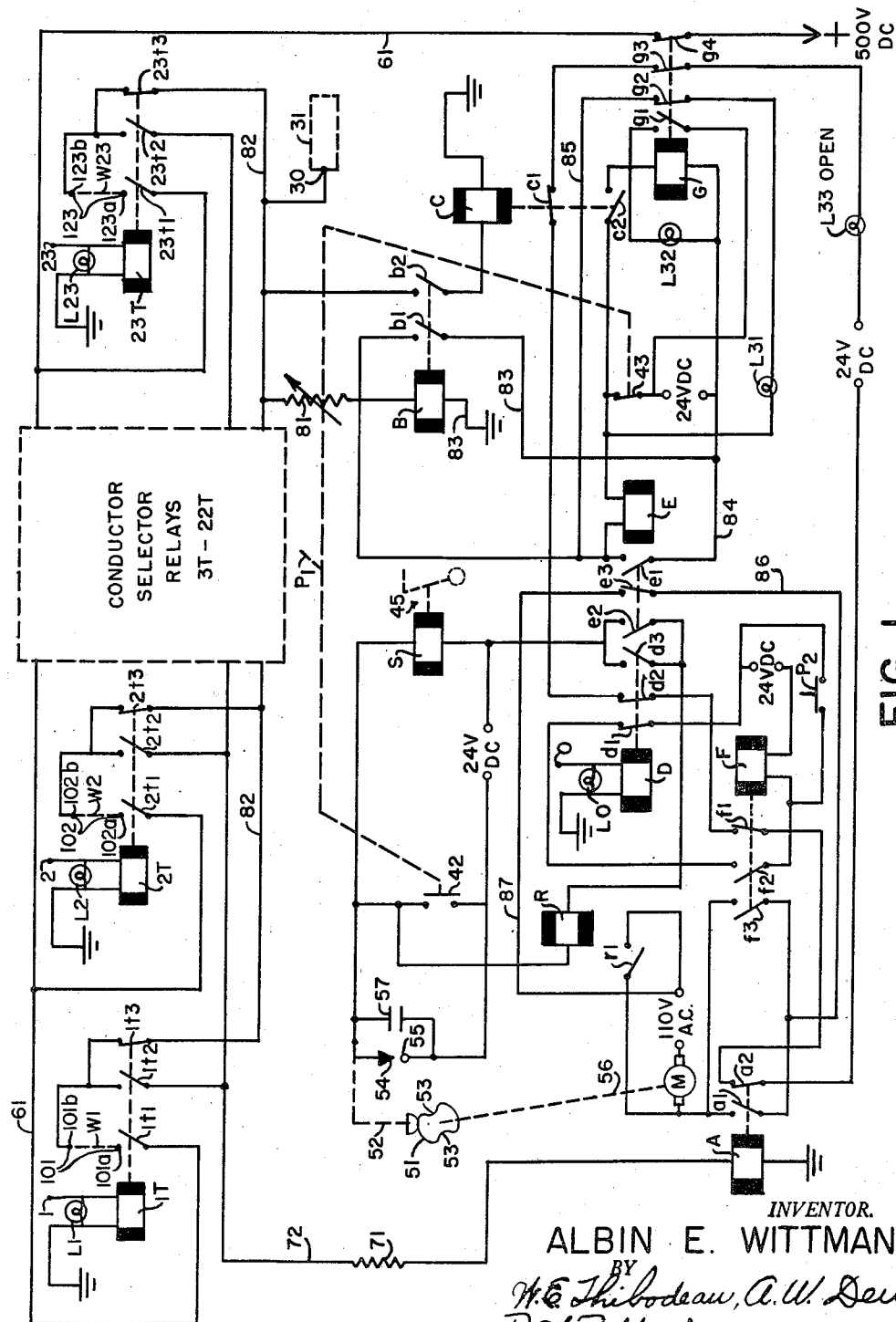
Figure 1 is a schematic circuit diagram of an embodiment of my invention.
Figure 2:
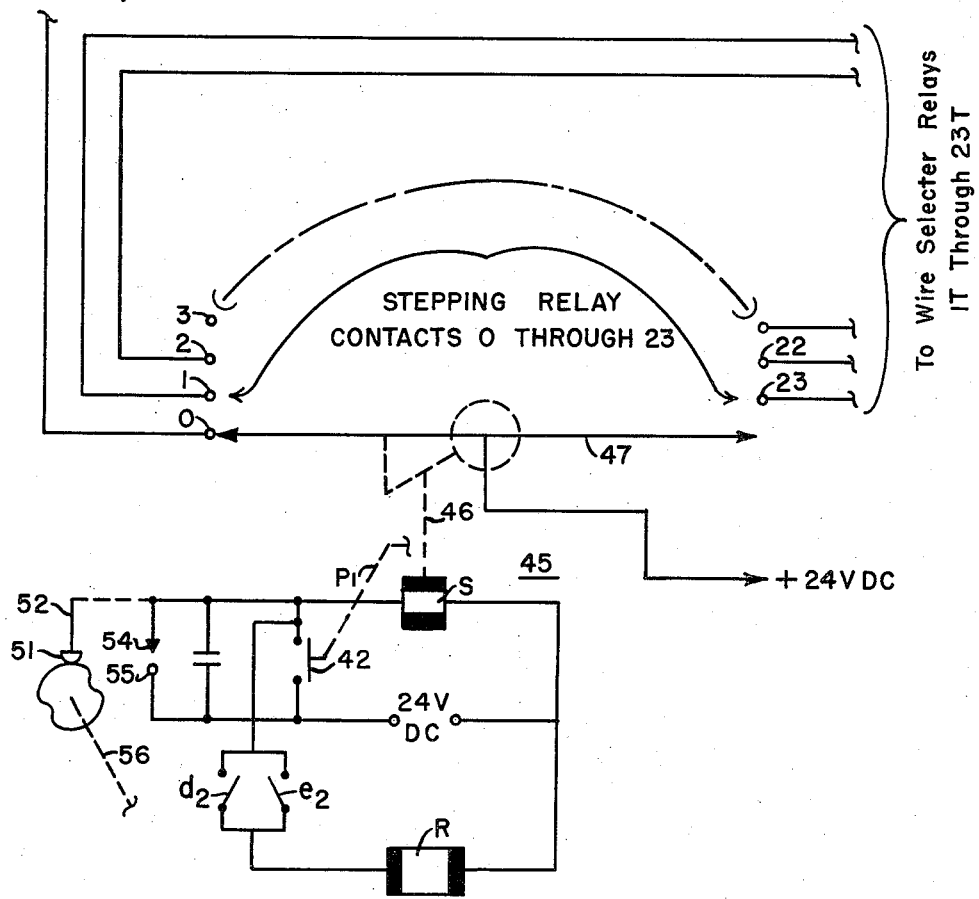
Figure 2 is a schematic diagram illustrating the stepping switch and associated operating circuit.
Figure 3:
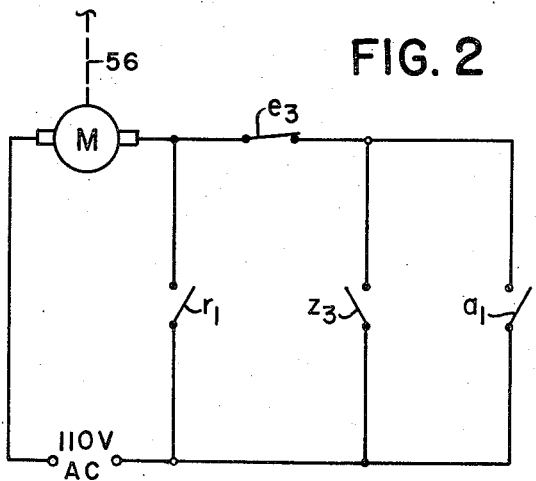
Figure 3 is a partial schematic diagram separately showing the motor circuit of Figure 1.
Figure 4:
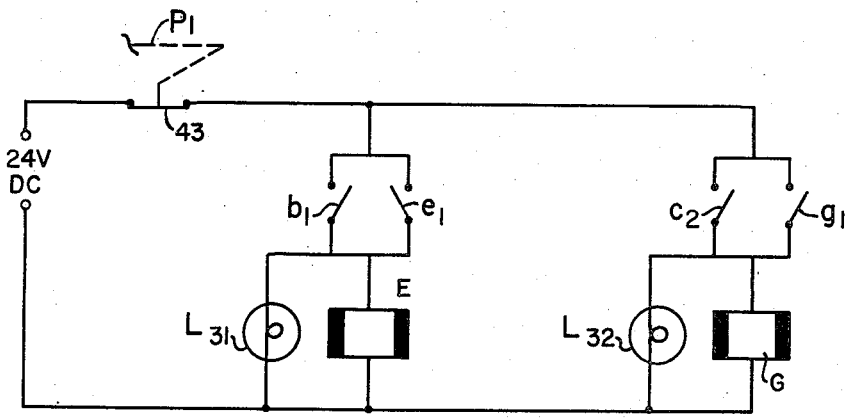
Figure 4 is a partial schematic diagram separately showing the circuit for testing indication of low insulation resistance and short circuit.
Figure 5:
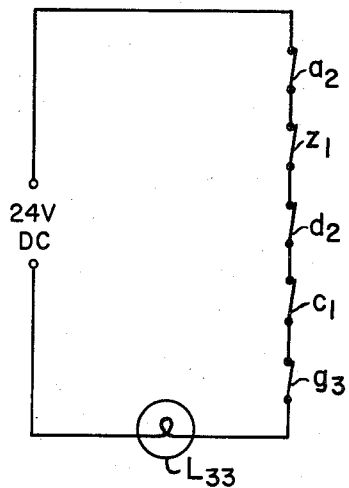
Figure 5 represents the partial circuit of Figure 1 for indicating an open line or conductor.
Figure 6:
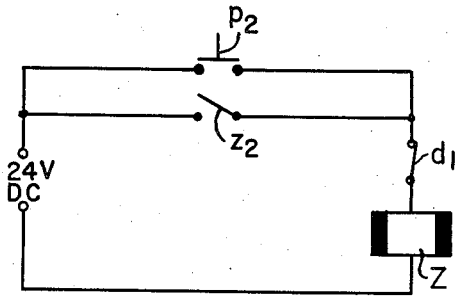
Figure 6 is a partial schematic diagram showing separately zeroing circuit of Figure 1.

Briefly, the preferred embodiment of my invention as illustrated in Figures 1 and 2 provides a plurality of pairs of connectors 101—123, each pair being attached for connecting thereto and therebetween an individual conductor of a multiconductor cable to be tested. The connectors 101—123 may be of any suitable type, as will be apparent to one skilled in the art, and will thus not be described in further detail. Obviously, the plurality of connectors 101—123 may be consolidated into a pair of sockets for engagement with each of the two ends of the cable to be tested. A source of high voltage, of such value as may be desired (in the instant illustration, 500 v. D. C.) is applied across the ends of each individual conductor W1—W23 of a multiconductor cable, through the connectors 101—123. This operation is initiated by pressing push button P1, and is accomplished automatically in sequential order with respect to each of the conductors W1—W23, and if no fault is located during the entire operation, the apparatus will return to zero position, indicating completion of the test through the energization of indication light L0. If, however, fault is found while testing any individual one of conductors W1—W23, then the sequential operation will immediately stop and one of the indication lights L31, L32, or L33 will be energized to indicate respectively that the fault is either low insulation resistance, a short between the selector conductor and some other conductor in the cable, or that the instant individual conductor is electrically open. Also, the individual indicating light of the plurality of lights L1—L23 associated with the individual conductor under test will be energized, thus indicating the faulty conductor. Upon noting the particular fault the operator may then press starting button P1 to again initiate the sequential testing of the next and remainder of the conductors in the cable. Should the operator wish at any time to return the apparatus to zero position, without testing for faults between the remaining pairs of connectors, such as when a cable having less than 23 conductors is under test, there is provided a zeroing circuit, energized by operation of zeroing button P2. Upon returning to zero position the sequential operation of the apparatus stops, and a new test operation may be started by again pressing starter button P1. The construction and operation of these various circuits described above will be described in detail as the description proceeds.

A multiconductor cable to be tested is suitably connected with its individual conductors each being connected between connectors 101a—101b, 102a—102b, etc., in successive order. For the illustrated embodiment a cable having up to 23 separate conductors may be tested, the respective connectors for each of the conductors being connectors 101—123. It will be apparent as the description proceeds that the number of conductors is not limited to 23, however; it only being necessary to provide, for each additional conductor to be tested, an additional pair of conductor connectors and an associated conductor selector relay, the latter of which will be described, infra.

Associated with each pair of connectors 101, 102, etc., is a conductor selector relay, respectively indicated at 1T—23T. Each individual wire selector relay 1T, 2T, etc., is energized by applying a suitable source of voltage, in the instant example 24 volts, to an associated terminal, respectively indicated at 1, 2, etc. (i. e. 1—23), and energization of each individual conductor selector relay is indicated by an indicating light respectively indicated at L1, L2, etc., which is in parallel with the individual conductor selector relay.

Application of energizing voltage to the terminals 1, 2, 3, is accomplished through the operation of a stepping switch generally indicated at 45. The stepping switch 45 has associated therewith a stepping relay S having an armature and ratchet mechanism schematically illustrated at 46 of usual construction in stepping relays, and such being well known to those skilled in the art will not be further described in detail herein. It will suffice to state that the stepping switch is of the type wherein the contact blade 47 steps upon the energization of the relay S, and that one cycle of energization and de-energization of relay S will cause double contact blade 47 of stepping switch 45 to progress one step from one terminal 0, 1, 2, etc., to the next respective terminal 1, 2, 3, etc., with the relay then in prepared state for another cycle of individual step movement. Upon the completion of a full cycle of 24 steps, the contact blade 43 is again at its original position in contact with terminal 0.

To initiate the sequential testing of the conductors W1—W23, the operator presses the starting button P1, thereby closing contact 42 and opening contact 43. The closing of contact 42 energizes the stepping relay S and relay R which is in parallel therewith. The energizing circuit for relay R will thus be seen to run from one side of the 24 v. D. C. source, through contact 42, relay R, closed contact $d3$ and back to the other side of the D. C. source, relay D being energized and contact $d3$ thus being closed, as described supra, in the zero position of the stepping relay. This energization of the stepping relay S actuates the associated ratchet mechanism of the stepping relay to move the contact blade 47 from terminal 0 to contact 1.

The stepping switch 45 having been advanced to its number 1 position causes relay 1T and indicating light L1 to be energized through switch blade 47 and terminal 1. The energization of relay 1T closes the associated contacts $1t1$ and $1t2$ and opens contact $1t3$. A suitable high voltage, as may be desired (in the illustrated case 500 volts D. C.), is thus applied across the limiting resistor 71 through closed contact $g4$, line 61, contact $1t1$, conductor connectors 101, contact $1t2$, current limiting resistor 71, and relay A, to ground. Each of the other conductor selector relays 2T—23T is de-energized when the stepping switch 45 is in number one position. Thus their associated contacts $2t3$—$23t3$ are all closed. Each of the contacts $2t3$—$23t3$ are connected in series between one end of their respective conductors W2—W23 under test and ground, through relay B and variable resistor 81. Also, a suitable connector 30 may be used to connect the conductive cable shield 31 in series with variable resistor 81 and relay B if it is desired to check for shorts and low resistance between conductors and shield. It will thus be seen that the 500 volt source of E. M. F. is also applied between the conductor W1, on the one hand, and all of the other conductors W2—W23 and shield 31, on the other hand, through closed contact $g4$, line 61, closed contact $1t1$, the first connector 101$a$ of the pair of conductor connectors 101, conductor W1 (or any part thereof), the insulation of conductor W1; in series-parallel, on the one hand shield 31 and associated connector 30, with on the other hand the insulation of each of the other conductors W2—W23; each of the other conductors W2—W23, the second connector 102$b$, 103$b$, etc., of each of the other conductor connectors 102—123, each of the closed contacts $2t3$—$23t3$; line 82, variable resistor 81, and relay B to ground. If the conductor W1 under test is continuous and has no fault, a closed circuit will be established from the 500 volt D. C. source through closed contact $g4$, line 61, closed contact $1t1$, connector 101$a$, conductor W1, connector 101$b$, closed contact $1t2$, line 72, resistor 71, and relay A, to ground. Energization of slow acting relay A closes contact $a_1$ and opens contact $a_2$. The opening of contact $a_2$ prevents the energization of open indicating light L22, to be later described. The closing of contact $a_1$ completes the power circuit to motor M, thereby causing the rotation of cam wheel 51 through the mechanical connection 56 therebetween. Rotation of cam wheel 51 in turn causes periodic closing of contact arm 54, and contact 55 through the action of cam follower 52 to which is attached and moveable therewith contact arm 54. A suitable capacitor 57 may be provided in parallel with the contact arm 54 and contact 55 to prevent arcing across these contacts. This periodic closing and opening of contact arm 54 and contact 55 causes corresponding energization and de-energization of stepping relay S, which in turn moves switch blade 47 step by step from one stepping relay contact terminal 2, 3, etc., to the next respective contact terminal 3, 4, etc., until the motor power circuit is broken through the de-energization of relay A and opening of contact $a_1$. Inasmuch as relay A is of the slow acting type, for the momentary interruption of current therethrough which occurs during the stepping action of the switch blade 47 from one contact terminal to the next, the relay A will thus not fall out and contact $a_1$ will remain closed, thereby continuing operation of the motor so long as the conductors under test are continuous and have no faults.

In the event that one of the conductors W1—W23 has a short between it and one of the other conductors, the relay B will be energized. Assuming that the short is located between conductor W2 and some other conductor later in the progressive testing such as conductor W23, the stepping switch blade 47 will progress to contact terminal 2, causing energization of conductor selector relay 2T, which in turn closes contacts $2t1$ and $2t2$ and opens contact $2t3$. The relay B will be energized through the circuit including the 500 volt source of E. M. F., through closed contact $g4$, line 61, closed contact $2t1$, connector 102$a$, part of conductor W2, part of conductor W23, connector 123$b$, closed contact $23t3$, line 82, variable resistor 81, relay B, to ground.

The energization of relay B closes contacts $b1$ and $b2$. The relay B is a highly sensitive, high resistance relay and draws very little current. Thus when a short occurs, relay C will be actuated through a similar circuit to relay B through line 82, contact $b2$, and relay C, to ground. The closing of contacts $b1$ causes energization of holding relay E through the circuit including closed contact 43, 24 volt D. C. source, line 83, closed contact $b1$, relay E and return to closed contact 43. Energization of relay E causes the closing of contacts $e_1$ and $e_2$, and opening of contact $e_3$. The closing of contact $e_1$ establishes a holding circuit for holding relay E through closed contact 43, 24 volt D. C. source, closed contact $e_1$, relay E, and return to closed contact 43. The opening of contact $e_3$ breaks the power circuit for motor M, thus causing the motor to stop. Indicating light L31 will not be energized in view of the opening of contact $g2$ through energization of relay G, as will be next described.

The energization of relay C causes the opening of $c1$ in the open light indicating circuit and closing of contact $c2$ in the energization circuit for relay W. The relay G and its associated short indicating light L32 in parallel therewith are thus energized through the circuit including closed contact $c2$, closed contact 43, 24 volt D. C. source, light L32 and relay G, and return to contact $c2$. The energization of relay G causes the closing of contact $g1$, thus establishing a holding circuit for the relay G and short indicating light L32. Energization of this relay also causes the opening of contacts $g2$, $g3$, and $g4$. As described supra, the opening of contact $g2$ prevents the energization of low insulation resistance indicating light L31. The opening of contact $g3$ prevents the energization of open indicating light L33. The opening of contact $g4$ removes the source of high voltage from the tester, and thus both relays B and C are substantially immediately de-energized upon the indication of the short, in order to prevent burnout of the highly sensitive relay B.

The entire apparatus is now effectively stopped through the opening of contact $e_3$, and consequent stopping of motor M, with indicating lights L2 and L32 energized, thus indicating a short between conductor W2 and some other of the conductors under test, or between W2 and the conductive shield 31. Upon later progressing to the other conductor which is shorted therewith, if such is the case, a similar light indication will be presented for such conductor.

The operator may now note the faulty conductor and its fault, and may then proceed to test the remaining conductors W3, W4, etc. In order to initiate the further testing operations, the operator again presses the starter button P1, thereby closing contact 42 and opening contact 43. The opening of contact 43 interrupts the circuit to both relay E and relay G, as well as short indicating light L32. It will be apparent that the de-energization of relay G effectively reestablishes the connection between the conductor selector relays and the 500 volt high voltage source through the closing of contact $g4$. The closing of contact 42 effectively establishes a circuit tween the 24 volt D. C. source and the stepping relay S. The action of relay S is similar to that as in the initial starting, as described supra, in that it causes stepping movement of the switch blade 47 to the next succeeding contact terminal.

In the event that cam wheel 51 should happen to be stopped in such position that the follower 52 were in the notch 53 thereof, the relay S would not operate to move the ratchet mechanism 46 and switch blade 47, since the contact arm 54, attached to and movable with the cam follower 52, would, prior to closing contact 42 of starter button P1, already be in contact with contact 55 and would maintain a closed circuit through the relay S until such time as the cam follower 52 were moved out of the notch 53 of cam wheel 51. To this end, a relay R is provided which is energized upon closing of contact arm 54 and contact 55 (provided either contact $d3$ or $e2$ is closed). The energization of relay R closes contact $r1$, thereby causing energization of the motor M through the 110 volt A. C. source. The motor M thus continues to run through energization of this auxiliary power circuit, after interruption of its main power circuit through contact $a_1$ and contact $e_3$, and thus continues to transmit motion through mechanical connection 56 to the cam wheel 51, thereby causing rotation of cam wheel 51 and moving the cam follower 52 out of the notch 53. The contact arm 54, and contact 55 are thus opened, and the stepping relay circuit is de-energized and thus properly prepared for restarting through actuation of starter button P1. It will be apparent that opening of contact arm 54 and contact 55 will cause de-energization of the auxiliary power circuit for motor M through the de-energization of relay R and consequent opening of contact $r_1$. Normal operation of the motor M during cyclic testing is accomplished through the energization of relay A and the closing of its associated contact $a_1$, as described supra.

The stepping switch 45 will again continue to step its switch blade 47 around from contact terminal to contact terminal until another faulty conductor under test is encountered. Again for purposes of illustration and simplicity, let it be assumed that the conductor W2 is the faulty conductor with a fault having its insulation resistance below a desired selected value. The action of the conductor selector relay 2T is similar to that described with respect to a short fault. The circuit between the conductors W2 and the other conductors, which for the sake of simplicity will be assumed to be conductor W23, is identical to the initially established circuit for short faults, wherein an initial circuit is established through relay B.

However, the final circuit for indication of low insulation resistance differs materially from that occurring when a short circuit is present, in that the relay C, which is a substantially higher current, low resistance relay, is not energized. This is due to the fact that when the insulation resistance is above a certain predetermined value, the total series resistance consisting essentially of the insulation resistance in series with the parallel connected variable resistor 81 and relay B on the one hand and the relay C on the other hand is sufficiently high to limit the current through the energization coil of relay C to a value below that required for operation of relay C. By varying the resistance of the variable resistor 81 upwardly or downwardly, the relay B may be made less or more sensitive respectively, and as will become apparent this has the effect of permitting testing for correspondingly lower or higher insulation resistance of the conductors under test.

Inasmuch as relay C is not brought into operation by relay B, relay G and short indicating light L32 will not be energized. Thus, the energization of relay B causes the completion of the energization circuit for relay E and low insulation resistance indicating light L31. The initial circuit for relay E is again through contact 43, 24 volt D. C. source, closed contact $b_1$, relay E and return to closed contact 43. Again the energization of relay E establishes a holding circuit for this relay through the closing of contact $e_1$. The completed circuit for the low insulation resistance indicating light L31, includes contact 43, 24 volt D. C. source, closed contact $e_1$, line 85, closed contact $g_2$, indicating light L31, and return to closed contact 43. The energization of relay E also opens the contact $e_3$, thus breaking the previously established power circuit to the motor M. Thus the opening of contact $e_3$ stops the motor M. If the conductor (W2) under test is continuous the relay A will remain energized, and the open indicating light L33 will be prevented from burning, due to open contact $a_2$. If the conductor (W2) under test is open in addition to having low insulation resistance then relay A will be de-energized and open indicating light L33 will also be energized as described, infra, in connection with operation for detecting open circuits, in addition to energization of low insulation resistance indicating light L31.

It will thus be seen from the foregoing that faulty insulation (i. e. insulation resistance less than the predetermined desired value as set into the tester by the resistance of relay B and the selected resistance of variable resistor 81) is indicated by low insulation resistance indicating light L31 and that the faulty conductor W2 is indicated by its indicating light L2. The motor M is stopped and the apparatus is now in condition for the test procedure to be continued by the operator through the pressing of starter button $P_1$.

As an example of the range over which the operator may test for low insulation resistance, one embodiment of the invention utilizing a 7K ohm relay B and 100K ohm variable resistor 81 permits a test range to indicate faulty insulation resistance below any value between 5 megohms and 100 megohms. It will be apparent that lower or higher values of insulation resistance may be indicated if desired by varying the sensitivity of relay B and/or by varying the range of variable resistor 81.

It will next be assumed that the conductor W2 is open circuited. As previously described, under normal conditions with a conductor having no faults the relay A is energized, thereby closing contact $a_1$ which completes the power circuit for the motor M, and also thereby opening contact $a2$ which prevents open indicating light L33 from being energized. However, immediately upon the stepping switch advancing to a conductor which is open circuited (in this case W2), current will cease to flow through relay A since the circuit for this relay is thereby broken. This opens contact $a_1$, thereby stopping the motor M and thus preventing the test from progressing any further. Simultaneously contact $a_2$ is closed, thus completing the energization circuit for open indicating light L33. This energization circuit will thus be seen to include closed contact $a_2$, closed contact $z_1$, closed contact $d_2$, closed contact $c_1$, closed contact $g_3$, open indicating light L33, 24 volt D. C. source, and return to contact $a_2$. The stepping switch remains in the same position so that the conductor indicating light (for conductor $W_2$ of the light is $L_2$) is energized and indicates the number of the open circuited conductor. Again, the operator may reinitiate the test operation by pushing starter button $P_1$.

It may be that the cable under test does not contain the maximum number of allowable conductors provided for in the test apparatus (in the instant example, a maximum of 23 conductors). It will be assumed by way of example that the cable has only 10 conductors. The stepping switch 47 will stop on the first step after the last conductor of the cable and indicate an open circuit. Thus, for the assumed example, the switch blade 47 of the stepping switch 45 will stop at the contact 11 for conductor selector relay 11T. There being no conductor between the connectors 111a and 111b, the relay A will be de-energized and the motor M will thus stop, thereby effectively stopping the test. If starter button $P_1$ is pushed, the stepping switch will only advance one step to contact 12 and again indicate an open circuit. Thus, if starter button $P_1$ is used for returning the stepping switch 45 to zero position, the operator will be required to press the starter button $P_1$ for individual and discontinuous step by step movement of the stepping switch 45 until the zero position is reached.

To avoid this, a zeroing circuit is introduced. By pressing zeroing button $P_2$ the relay F will be energized and will hold in the energized state through the resultant closing of contact $f2$. Contact $f3$ also closes, thereby shunting the now open contact $a_1$, and completes the power circuit for the cycling motor M through line 86, closed contact $e_3$, line 87, 110 volt A. C. power source, motor M, and closed contact $z3$.

The stepping switch 45 now advances without interruption until the zero position is reached. The operation of stepping switch 45 occurs in the normal manner through the opening and closing of contact arm 54 and contact 55 by the rotation of cam wheel 51. During this stepping process to zero position the contact $f_1$ is open through the action of relay F, thus breaking the circuit for open indicating light L33 and preventing the same from lighting.

At the zero position the switch blade 47 comes into contact with contact terminal 0, thus energizing relay D, which opens contact $d_1$, thereby de-energizing relay F. Contact $f3$ now opens, thus stopping the motor M. Although contact $f_1$ is closed through the de-energization of relay Z, it will be seen that energization of relay D opens contact $d_2$, thus preventing open indicating light L33 from lighting. Contact $d_3$, which is thus closed in the zero position, serves a similar purpose to contact $e_2$, in that it prepares the circuit for energization of relay R when contact arm 54 and contact 55 are closed, as described supra. The test is now completed, and a new cable may be attached to the connectors 101—123 for testing thereof.

Assuming that there are the maximum number of conductors in the cable to be tested (i. e. 23 conductors), the test operation will proceed in the normal fashion with the stepping switch proceeding to the zero position, where the operation stops through the opening of the circuit to relay A and the consequent stopping of motor M. As described above in the zeroing operation, the relay D is energized at the zero position of the stepping switch 45, thus opening contact $d_2$ and breaking the circuit for open indicating light L33. Also, as in the zeroing operation, the indicating light L0 is energized simultaneously with relay D thus indicating that the test operation is completed.

The various circuits have been shown as having separate sources of E. M. F. merely for the purpose of convenience and simplicity of illustration. It will readily be apparent that a common source of E. M. F. may be utilized for each of the 24 v. D. C. sources indicated, or separate sources may be used, as may be desired. For instance, a single transformer might have a first secondary connected through a suitable rectifier and filter to give a 24 v. D. C. source of E. M. F. for actuating the various relay circuits, and also a second secondary winding connected through a suitable rectifier and filter to give a 500 v. D. C. source of E. M. F. for application across the conductor terminals 1—23 and corresponding actuation of associated relays A, B, and C. Obviously, any suitable voltages and relays may be utilized, as desired, and any suitable electrical power supply may be utilized. The disclosure of the use of 500 volts and 24 volts are thus for illustrative purposes only.

The speed at which the test operation may proceed on a multiconductor cable in which there are no faults is determined substantially by the time constant or delay time for actuation and de-actuation of stepping switch 45, including its associated relay S.

While I have shown a plurality of conductor selector relays for intermediate action in selecting the conductors to be tested, and I have found this embodiment to be highly successful, other selector means might also be provided such as the provision of a bank of contacts for the stepping switch at each stepping switch position with a plurality of ganged switch blades, whereby the stepping relay itself selects directly the individual conductor to be tested through closing of two normally open contacts and opening a normally closed contact associated with each conductor to be tested, these contacts for position one corresponding respectively to contacts $1t1$, $1t2$, and $1t3$ respectively It will be apparent from the foregoing description that my invention as embodied in the illustrated apparatus is simple in construction, reliable in operation, and provides automatic sequential testing of multiconductor cables simultaneously for continuity, shorts, and low insulation resistance.

Obviously, many modifications of my invention will be apparent to those skilled in the art, and it is to be understood that the illustrated physical embodiment as shown and described herein is intended as an illustrative example only. It will therefore be understood that my invention is not limited to the illustrated embodiment, but is only to be limited by the scope of the appended claims.

I claim:

1. Multiconductor cable testing apparatus comprising a plurality of pairs of connectors for connection to the ends of a corresponding plurality of conductors to be tested, a corresponding plurality of normally open first contacts each in series with one of said pairs of connectors, a corresponding plurality of second contacts normally open and each being in series connection with one of said pairs of connectors, a corresponding plurality of third normally closed contacts each being in parallel with a corresponding one of said pluralities of second contacts normally closed and in series connection with a corresponding one of said plurality of first contacts, and relay means energized by a single E. M. F. source for closing one of said plurality of first contacts and a corresponding one of said plurality of second contacts and for opening the corresponding one of said plurality of third contacts.

2. Multiconductor cable testing apparatus comprising a plurality of pairs of connectors for connection to the ends of a corresponding plurality of conductors to be tested, a corresponding plurality of normally open first contacts each in series with one of said pairs of connectors, a corresponding plurality of second contacts normally open and each being in series connection with one of said pairs of connectors, a corresponding plurality of third normally closed contacts each being in parallel with a corresponding one of said pluralities of second contacts normally closed and in series connection with a corresponding one of said plurality of first contacts, relay means energized by a single E. M. F. source for closing one of said plurality of first contacts and a corresponding one of said plurality of second contacts and for opening, and relay means in circuit relation with said plurality of third contacts for detecting current flow therethrough.

3. Multiconductor cable testing apparatus comprising a plurality of pairs of connectors for connection to the ends of a corresponding plurality of conductors to be tested, a corresponding plurality of normally open first contacts each in series with one of said pairs of connectors, a corresponding plurality of second contacts normally open and each being in series connection with one of said pairs of connectors, a corresponding plurality of third normally closed contacts each being in parallel with a corresponding one of said pluralities of second contacts normally closed and in series connection with a corresponding one of said plurality of first contacts, relay means energized by a single E. M. F. source for closing one of said plurality of first contacts and a corresponding one of said plurality of second contacts and for opening the corresponding one of said plurality of third contacts, and relay means in circuit relation with said plurality of first and second contacts for detecting current flow therethrough.

4. Multiconductor cable testing apparatus comprising a plurality of pairs of connectors for connection to the ends of a corresponding plurality of conductors to be tested, a corresponding plurality of normally open first contacts each in series with one of said pairs of connectors, a corresponding plurality of second contacts normally open and each being in series connection with one of said pairs of connectors, a corresponding plurality of third normally closed contacts each being in parallel with a corresponding one of said pluralities of second contacts normally closed and in series connection with a corresponding one of said plurality of first contacts, relay means energized by a single E. M. F. source for closing one of said plurality of first contacts and a corresponding one of said plurality of second contacts and for opening, relay means in circuit relation with said plurality of third contacts for detecting current flow therethrough, and relay means in circuit relation with said plurality of first and second contacts for detecting current flow therethrough.

5. Multiconductor cable testing apparatus comprising a plurality of pairs of connectors for connection to the ends of a corresponding plurality of conductors to be tested, a corresponding plurality of normally open first contacts each in series with one of said pairs of connectors, a corresponding plurality of second contacts normally open and each being in series connection with one of said pairs of connectors, a corresponding plurality of third normally closed contacts each being in parallel with a corresponding one of said pluralities of second contacts normally closed and in series connection with a corresponding one of said plurality of first contacts, relay means energized by a single E. M. F. source for closing one of said plurality of first contacts and a corresponding one of said plurality of second contacts and for opening, and relay means in series with said plurality of third contacts for detecting current flow therethrough.

6. Multiconductor cable testing apparatus comprising a plurality of pairs of connectors for connection to the ends of a corresponding plurality of conductors to be tested, a corresponding plurality of normally open first contacts each in series with one of said pairs of connectors, a corresponding plurality of second contacts normally open and each being in series connection with one of said pairs of connectors, a corresponding plurality of third normally closed contacts each being in parallel with a corresponding one of said pluralities of second contacts normally closed and in series connection with a corresponding one of said plurality of first contacts, relay means energized by a single E. M. F. source for closing one of said plurality of first contacts and a corresponding one of said plurality of second contacts and for opening the corresponding one of said plurality of third contacts, and relay means in series with said plurality of first and second contacts for detecting current flow therethrough.

References Cited in the file of this patent

UNITED STATES PATENTS

| 2,584,680 | Doncyson | Feb. 5, 1952 |
| 2,622,130 | Kabell et al. | Dec. 16, 1952 |